United States Patent [19]

Takavarasha

[11] 4,387,909
[45] Jun. 14, 1983

[54] SUSPENSION SYSTEMS

[76] Inventor: Murashiki-Job C. Takavarasha, 24 Carlyle Rd., Edgbaston, Birmingham B16 0BJ, England

[21] Appl. No.: 222,983

[22] Filed: Jan. 7, 1981

[30] Foreign Application Priority Data

Jan. 10, 1980 [GB] United Kingdom ............... 8000845

[51] Int. Cl.³ .......................................... B60G 11/26
[52] U.S. Cl. ................... 280/104; 267/64.25; 280/702
[58] Field of Search ............ 280/104, 702, 703; 267/64.25

[56] References Cited

U.S. PATENT DOCUMENTS

| | | | |
|---|---|---|---|
| 2,443,433 | 6/1948 | Sanmori | 280/104 |
| 2,914,338 | 11/1959 | Kress | 280/104 |
| 2,986,403 | 5/1961 | Ziccardi | 280/702 |
| 3,188,072 | 6/1965 | Wüstenhagen | 267/64.25 |
| 3,256,006 | 6/1966 | Bandur | 267/64.25 |
| 3,563,566 | 10/1968 | Weber | 280/702 |
| 3,752,497 | 8/1973 | Enke | 280/702 |
| 3,917,307 | 11/1975 | Shoebridge | 280/104 |
| 4,095,822 | 6/1978 | Thornhill | 280/702 |

Primary Examiner—Joseph F. Peters, Jr.
Assistant Examiner—John A. Carroll
Attorney, Agent, or Firm—Holman & Stern

[57] ABSTRACT

A suspension system for a member such as a vehicle chassis having wheels on which it is supported at four corners, piston and cylinder units at each corner being arranged to control movement under changing load conditions, and each unit having upper and lower chambers, the lower chamber in one unit being connected to the upper chamber in an adjacent unit and the upper chamber in unit being connected to the lower unit in the other adjacent unit, the connections between all the units forming a closed circuit, whereby movement at one position tends to produce movement at an adjacent position in the same sense.

9 Claims, 6 Drawing Figures

SUSPENSION SYSTEMS

This invention relates to suspension systems which may be applied to vehicles including road or rail vehicles or aircraft or to static assemblies such as machinery mountings or to beds.

The suspension system is intended to provide compensatory movement at one part of a suspended member when load is applied thereto at another. It is possible, therefore, to provide stability in a static situation or to provide for even suspension performance in a moving vehicle. It will also provide damping against vibrations.

There are in existence many suspension systems which employ fluid which is transferred from one part of the system to another to provide a cushioning effect as loads are applied unevenly. In motor vehicles there are systems which include provision for transfer of fluid between the forward and the rear ends of the vehicle as the load, due to unevenness of the road surface, is applied to the vehicle. There are also systems in which there is interconnection between units at the two sides of the vehicle but this interconnection is for the purpose of allowing a common pump to be connected, to make static height adjustment easier. Other vehicle suspensions include pumps by means of which fluid is pumped to different inflatable suspension units at the vehicle corners in accordance with the demand signals from appropriate sensors. Such systems are, of necessity, relatively complex. These systems are generally designed specifically for vehicle applications.

The object of the present invention is to provide a suspension system which is simple but effective in providing even suspension of a moving member such as a vehicle and which is also capable of static use in which load compensation is simply effected.

In accordance with the present invention a suspension system for a member which is supported at a number of spaced positions by fluid actuated units at each of the said positions, characterised in that each unit defines a pair of chambers to contain fluid, changes in volume of the chambers, under changing load conditions for the member, resulting in an element of the unit moving relatively to said member, said element being connected to means for supporting the member, and the chambers of the units at the respective positions being interconnected in such a way that fluid acting in one unit to move said element thereof in one sense tends to produce movement of the element in an adjacent unit in the same sense, such interconnection existing between all the units in a closed circuit.

The invention will now be described by way of example, with reference to the accompanying drawings, in which.

Figure 1:
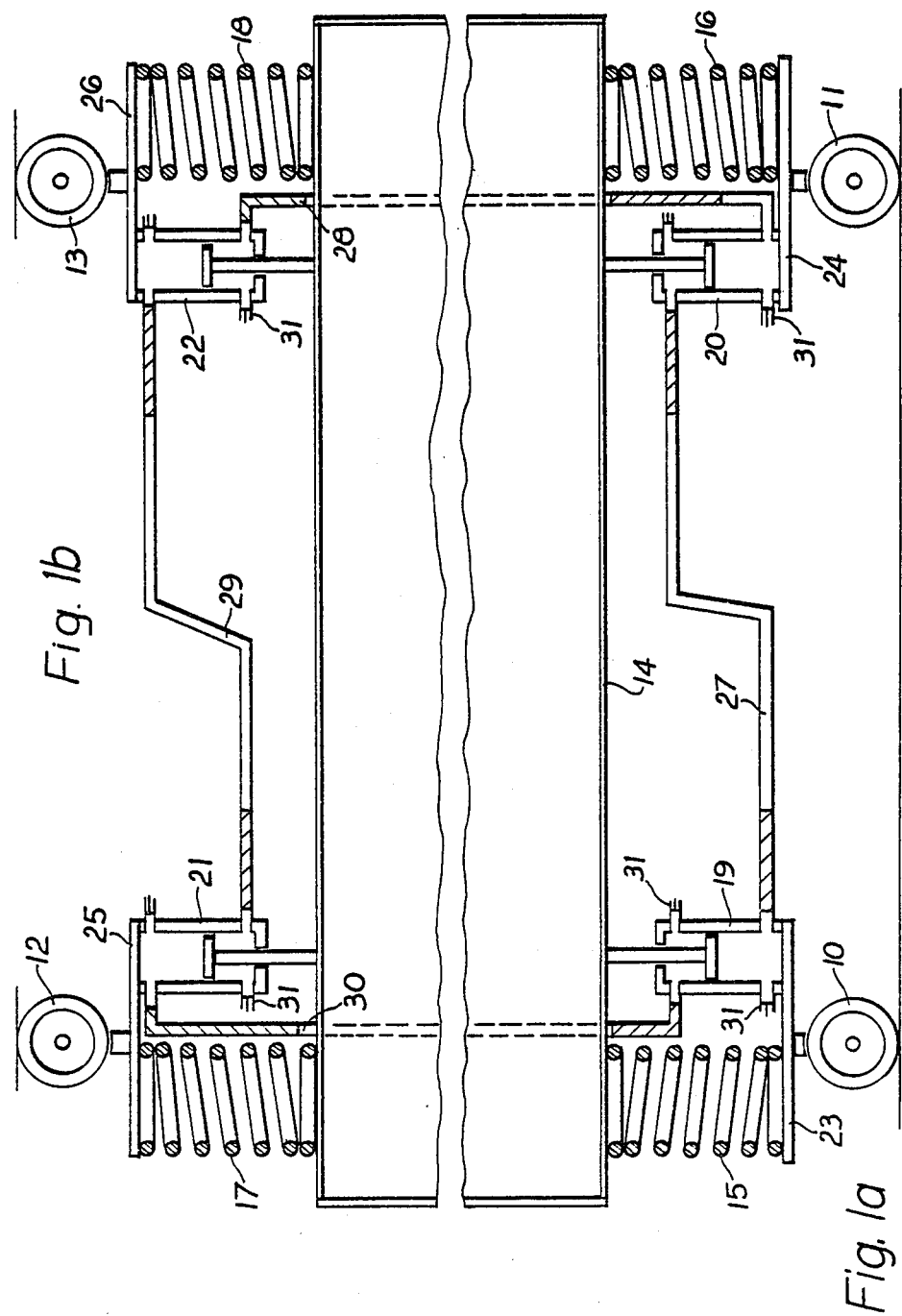
FIG. 1A is a diagrammatic side view of a vehicle suspension system constructed in accordance with the invention.
FIG. 1B is the same diagramatic side view as FIG. 1A, but from the opposite side and upside down as if the drawing was folded in half at the horizontal break line.

With reference to FIG. 1 this shows, in plan, a suspension system for a four-wheeled vehicle in which however each of the suspension units is shown in side view.

The four wheels are identified by numerals 10, 11, 12 and 13. Each is engaged on the ground and carries the vehicle chassis frame, indicated generally at 14, through a coiled compression spring 15, 16, 17, 18. However, it is to be understood that other forms of springing or other resilient means may be used for carrying the vehicle chassis 14.

Adjacent to each of the springs is a piston and cylinder unit 19, 20, 21, 22. At each of the four positions at which the vehicle chassis is supported, the spring and piston and cylinder combination are arranged to act between the chassis and a support plate 23, 24, 25 and 26. This arrangement is however purely diagrammatic and in a vehicle the parts may be shaped in accordance with design criteria.

In this example, each piston and cylinder unit 19, 20, 21 and 22 has the cylinder connected to said support plate 23, 24, 25 or 26 whereas the piston is connected by its rod to the chassis 14. There are therefore defined within the cylinder chambers at opposite sides of the piston. From each chamber leads a pipe communicating with the cylinder at an adjacent corner of the vehicle. As shown the pipes 27, 28, 29 and 30 communicate between a lower end of one cylinder and the upper end of the adjacent cylinder. Therefore, there is intercommunication around a complete closed circuit between upper and lower ends of all four cylinders 19, 20, 21, 22.

In each cylinder at each end thereof there are, furthermore, filling valves 31. In this form, each is a non-return valve and enables the system to be filled at any point, with fluid, as required. Other filling valve arrangements may be used in other versions of the system.

In the vehicle suspension system shown in FIG. 1, the fluid used is a compressible fluid such as air. However, in certain other applications, it may be desirable to use as a fluid, a mixture of compressible gas and an incompressible liquid such as hydraulic oil. In the particular system shown an incompressible liquid alone would not be satisfactory unless hydraulic accumulators were used.

In a further example of suspension system apparatus equivalent to FIG. 1 is used but omitting the springs 15, 16, 17, 18. The cylinders are filled with compressible fluid which may be partly liquid and partly gaseous. As the load conditions change, the pistons move in their respective cylinders but because the piston is carried on a piston rod extending through the upper one of the two chambers within the cylinder, the volumes of the chambers change unequally. Since the volumes below the pistons are larger than those above, the lower chambers will provide cushioning effect or fluid springs which can support the vehicle, if sufficient initial pressurization is provided, without need for the additional support springs of the FIG. 1 construction.

In use, the wheels 10, 11, 12, 13 travelling along a roadway, meet unevenness and will individually tend to move relatively to the chassis frame 14. If, for example the wheel 10 strikes a bump and tends to rise this will have the effect of compressing the spring 15 and at the same time moving the cylinder 19 upwards relatively to its piston. This will increase the pressure in the chamber below the piston thus increasing the pressure in the pipe 27 leading to the adjacent corner of the vehicle, at which the wheel 11 is situated. The increase in pressure in the pipe 27 will be felt above the piston in the cylinder 20 thus causing it to move downwardly and thence compressing the spring 16. This will in turn pressurize the pipe 28 so that, at the wheel position 13, a similar downward movement will occur. This will pressurize the hydraulic fluid in the pipe 29 so that a downward effect is produced also at the position of the wheel 12. When this has occurred the pressure will be applied again to the cylinder 19 but above the piston therein. This will counteract the original tendency to move and therefore the vehicle will tend to ride evenly, as unevenness on the road surface is encountered.

When the vehicle negotiates a turn there is normally a tendency for a load to be experienced on the vehicle at the outside of the bend, which is in excess of that on the inside, due to centrifugal force. Any such tendency with this apparatus will produce a levelling effect because units at two of the positions subjected to higher loads will tend to transmit a balancing force to the two at the other side, so that the vehicle lateral tilt is minimised.

Figure 2:
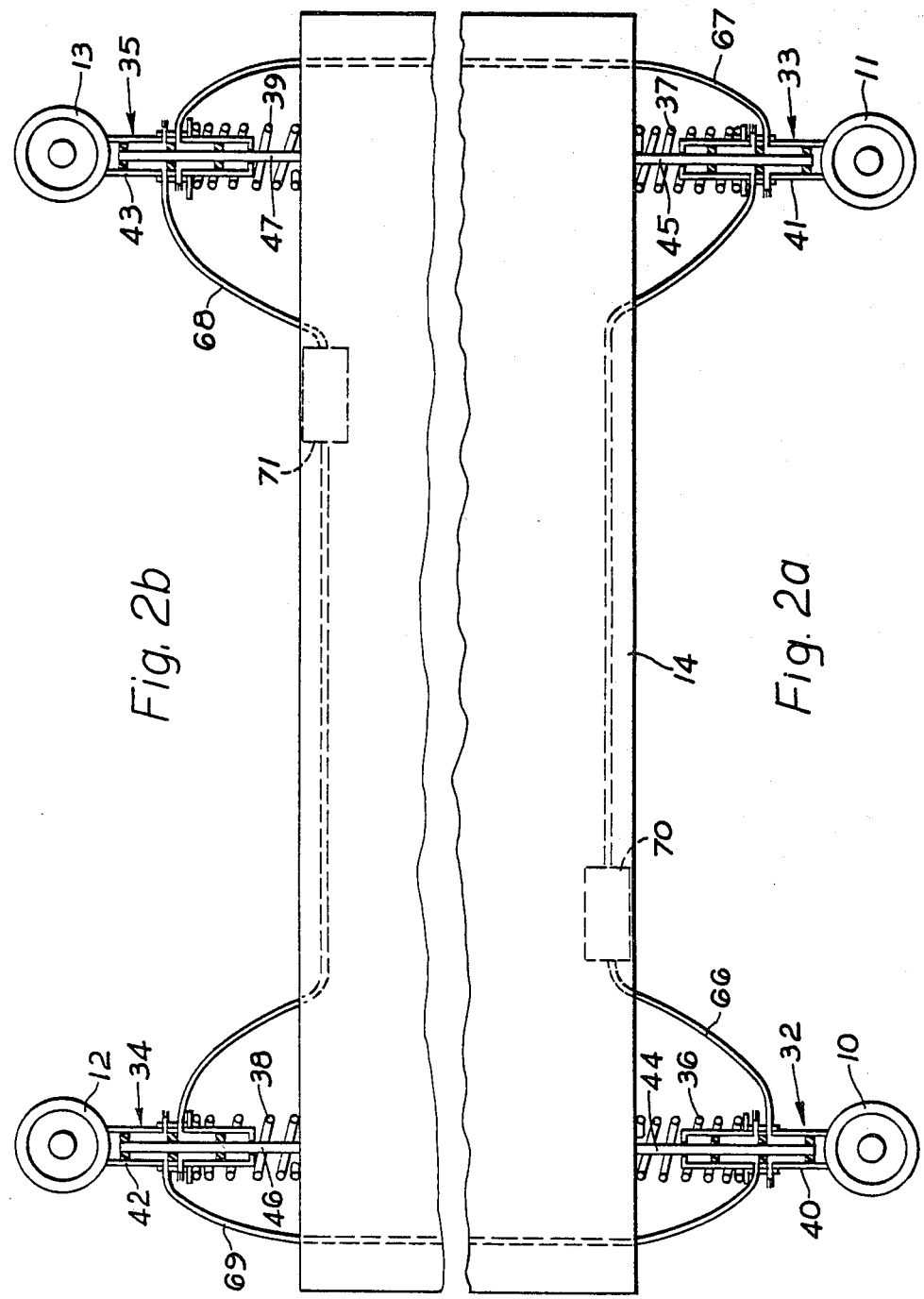
FIG. 2A is a diagrammatic side view of a further form of vehicle suspension system constructed in accordance with the invention.
FIG. 2B is to FIG. 2A as FIG. 1B is to FIG. 1A.

FIG. 2 shows a system which works on similar principals to that in FIG. 1 but is differently constructed. Numerals 10, 11, 12 and 13 indicate the wheels and numeral 14 the chassis of a vehicle.

Each wheel is mounted on the chassis through a combination unit 32,33,34,35. One of these units 32 is shown also in FIG. 3 on an enlarged scale. Each such unit includes a coiled compression spring 36 37 38 39 partially surrounding a cylinder 40, 41, 42, 43 within which is slidably mounted a piston and piston rod assembly 44, 45, 46, 47.

Figure 3:
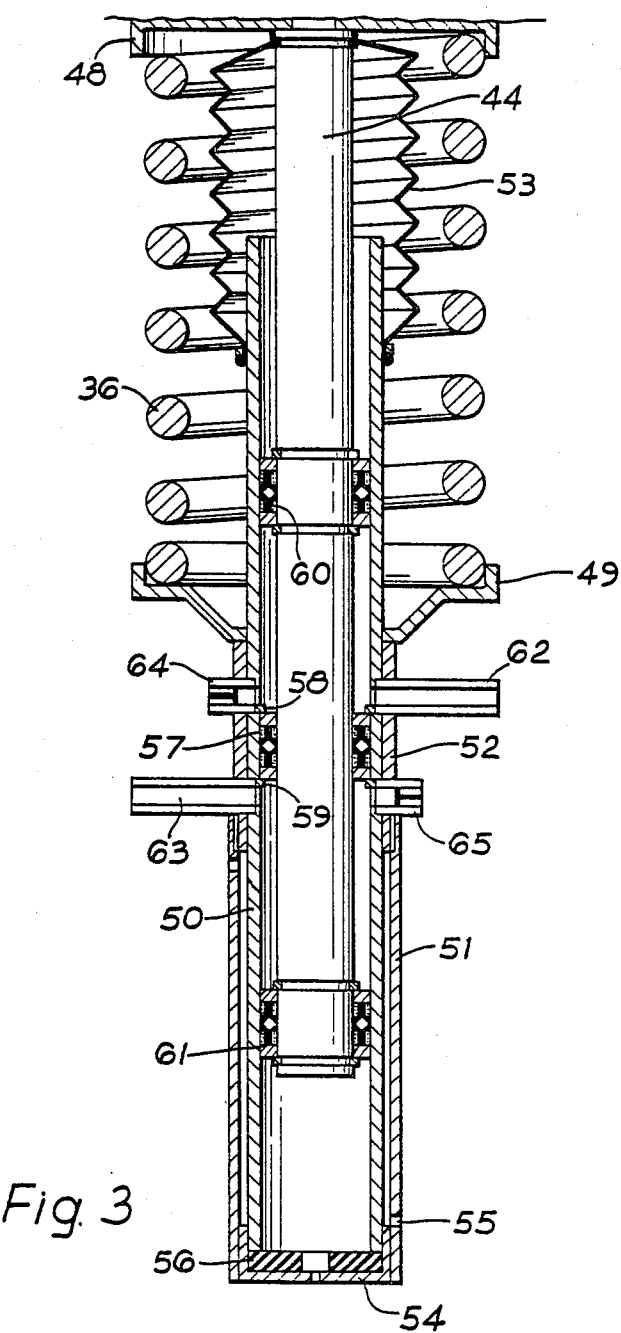
FIG. 3 is a cross-sectional view of a unit used in the system shown in FIG. 2.

Referring now to FIG. 3 it will be seen that the coiled compression spring 36 engages on an abutment plate 48 which is secured to the chassis 14. To the centre of this plate is attached the piston rod of the assembly 44. The other end of the spring engages on an abutment plate 49 which is fixed onto the cylinder. The cylinder is formed from an inner tubular sleeve 50 and, at one end, a shorter outer tubular sleeve 51 concentric with and surrounding the inner sleeve 50. A collar 52 is secured to the inner sleeve 50 near its mid region and is screwed or welded to the outer sleeve 51. At its end remote from the outer sleeve 51 the collar 52 forms a shoulder against which the spring abutment plate 49 engages. The outer sleeve 51 is provided for attaching lugs or other fixings so that the inner sleeve, the interior of which forms the cylinder, is free from welded or other attached components on the exterior, the fitting of which could cause distortion. The collar 52 is primarily for reinforcement.

One end of the cylinder nearest to the spring abutment plate 48 is open but this end is surrounded by a dirt excluding flexible bellows 53. The interior of this may be filled with oil to prevent corrosion of the portions of the cylinder and piston rod not in contact in use. The other end of the cylinder is closed by an apertured end cap 54. The space between the two sleeves 50 and 51 is vented through a small outlet 55 and a cushioning washer 56 is positioned within the end cap 54. Other constructions of cylinder may be employed. For example, where the cylinder wall is thick, the collar 52 may be omitted. The spring may be fitted separately, thus dispensing with the need for spring abutments on the cylinder.

At the position of the collar 52 and inside the inner sleeve 50 there is a seal assembly 57 held against axial movement within the cylinder by spring rings 58 59 and arranged to engage on the piston rod 44.

Carried on the piston rod are two further sealing assemblies 60, 61. The sealing assembly 61 is at the end of the rod remote from the spring abutment plate 48 and the chassis 14 and the other sealing assembly 60 is positioned at the other side of the sealing assembly 57 in the cylinder wall. The sealing assemblies 60, 61 are spaced apart by a distance permitting maximum travel of the cylinder in relation to the piston rod in either of two opposite directions from the static condition shown in FIG. 3.

Fluid inlet and outlet passages 62, 63 are provided in the wall of the cylinder. The passage 62 enters the space defined between the sealing assembly 57 and the sealing assembly 60 on the piston rod whereas the passage 63 opens into the space between the sealing assembly 57 and the sealing assembly 61 on the piston rod end. Opposite the passages 62, 63 are respective filling valves 64,65 which permit entry of fluid under pressure into the system but prevent escape therefrom. Filling valves of various kinds may be employed and their positions may be anywhere that may be convenient, for example on pipe sections between the cylinders.

As shown in FIG. 2 the wheel is attached by any convenient manner to the cylinder and this is capable of movement relatively to the chassis under the control of the spring 36. Movement of the cylinder in relation to the piston rod 44 carrying the two sealing assemblies 60,61 causes changing volume of the two spaces into which the passages 62 and 63 open respectively.

The passages 62,63 are connected as shown in FIG. 2 through pipes 66, 67, 68, 69 in similar manner to the pipes 27, 28, 29 and 30 in the FIG. 1 construction.

If the wheels 10 and 12 are at the front of the vehicle and the wheels 11 and 13 at the rear it will be seen that between front and rear there are two damper units 70, 71 which are mounted on the chassis. These provide valves which control the flow of fluid between front and rear of the vehicle in order to avoid undue pitching of the vehicle which might result from free transmission of fluid between the ends. It is normally not necessary to have similar damping arrangements between the two front and between the two rear wheels but this can be included if required. Similarly this may be omitted if found unnecessary between front and rear of the vehicle. Indeed it should be the minimum required for stability and suppression of vibrations. Since the weight distribution between front and rear of the vehicle is often uneven, the springing may be so connected that its mechanical advantage may be different at opposite ends of the vehicle. This could be accomplished, for example by swinging arms of different lengths.

This system is designed for use with an incompressible liquid such as hydraulic oil. With the piston arrangement shown the total volume within the system does not alter with changing positions of the pistons in their respective cylinders.

It is possible to use individual systems at the front and at the rear of the vehicle or at one end only. In such a system for connecting the wheels 10 and 12 a closed circuit is made between the units 32 and 34 in exactly the same way as has been described.

A similar system may be incorporated into a motorcycle although it may be convenient to provide four units on such a motorcycle since there are four suspension points at opposite sides of the two wheels respectively.

The system may be used for example on passenger cars or on heavy goods vehicles designed for road going use. It is similarly possible to use this on railway vehicles although front to rear control may be unnecessary as side to side movement is the only significant movement requiring control on such a vehicle.

The sealing assemblies are conveniently of the kind described in Pending Patent Application No. 8012393 or as described in Pending Patent Application No. 8033057.

A similar or alternative form of apparatus may be used for the suspension of a bed, primarily for orthopaedic use. Such a bed is rectangular and has at four corners respective suspension units. The bed includes a platform to which, at each corner, are attached posts. Each post is made in two parts connected by screw threads. Between these two parts of the posts is trapped a plate. The lower end of each post has a head.

In one example the bed is carried on a foot assembly including a rectangular base carrying two uprights. To the uprights is connected a pair of spaced plates connected together by a shroud and between them and enclosed by the shroud is the trapped plate. The pair of spaced plates are apertured to receive the posts and the head on each post serves as a stop to prevent the post passing entirely through these spaced plates in an upward direction. Between the trapped plate and the lower of the spaced plates are two spaced coil compression springs surrounding the posts respectively. With this arrangement, therefore, the trapped plate is connected to the posts and is mounted upon the springs and will thus move with the bed platform under any load applied against the action of the springs.

Situated between the trapped plate and lower and upper spaced plates are two inflatable flexible bags respectively. These are preferably made from reinforced rubber material and are fluid tight. Each such bag has an inlet communicating with a connector block on the spaced plates respectively. Each connector block has a filling valve whereby air or other fluid may be pumped in under pressure from an external source. Air is used in this example since it has limited compressibility. However, other liquid or gaseous fluids may be used.

Each connector block also has a pipe leading from it. These pipes communicate with similar suspension units at adjacent corners of the bed, the connections being similar to those in the FIG. 1 suspension system. Therefore, the pipe leading from the upper bag in one suspension unit communicates with the lower bag in the adjacent suspension unit. Also the other pipe which communicates with the lower bag communicates with the adjacent suspension unit upper bag.

In use, load applied nearer one corner of the bed tends to compress the nearest spring and at the same time drive fluid out of the lower bag and into the upper bag of the adjacent unit. The bags are connected in a closed circuit so that the bed will tend to move down evenly in accordance with the load whether this is applied centrally or towards one corner.

The apparatus may be adapted for use in mounting platforms for such apparatus as delicate instruments which are thus insulated from vibrations, particularly large fluctuation vibrations. Floors for recording studios or record playing turntables or measuring instruments may be suspended by such apparatus.

Figure 4:
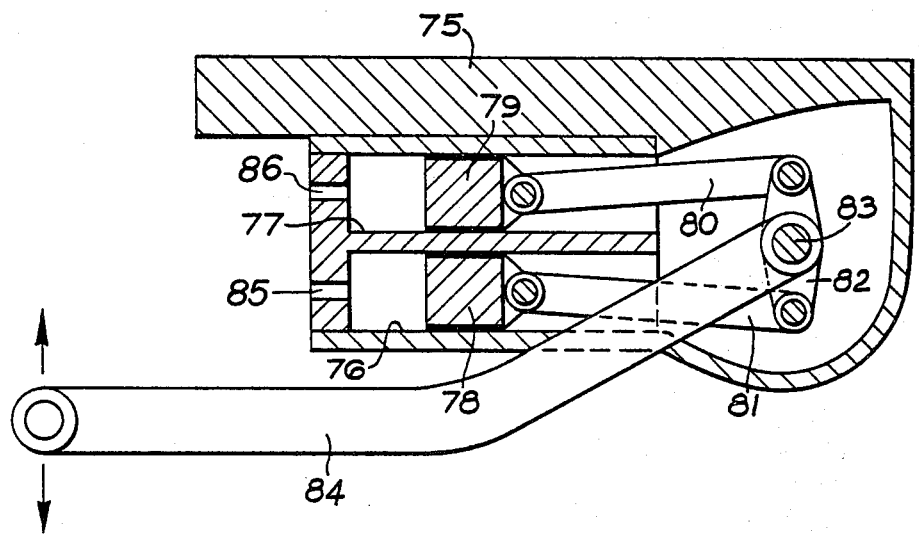
FIG. 4 shows an alternate embodiment of the suspension unit of the present invention.

FIG. 4 shows an alternative form of unit which may be used. This comprises a body 75 for securement to the member to be supported, whether this is a bed, vehicle or other apparatus. In the body 75 is formed two parallel cylinders 76, 77 containing respective pistons 78, 79 attached by connecting rods 80, 81 to a pivoting lever 82. The lever 82 is mounted on a shaft 83 journalled in the body and connected, outside the body to a link 84 which in use is attached to the wheel or foot of the apparatus, as the case may be.

Inlet openings 85, 86 are provided into the cylinders 76, 77 to allow fluid to enter and leave. The unit is interconnected with similar units at other positions in the same manner as the FIGS. 1 and 2 systems and works in the same way.

I claim:

1. A suspension system for a member which is supported at a number of spaced locations by fluid actuated units at each of said locations, each unit defining a pair of chambers to contain fluid, with changes in volume in said chambers under changing load conditions resulting in an element of said unit moving relative to said member, said element being connected to means for supporting member, and the chambers of the units at the respective positions being interconnected so that fluid acting in one unit to move said element thereof in one direction produces movement of an element in an adjacent or opposite unit in the same direction, said interconnection existing between the units in a closed circuit, characterized by each of said units including a cylinder and first sealing means secured therein, said each unit further including a piston rod slidably engaged within said first sealing means and carrying thereon spaced apart second and third sealing means, said second and third sealing means each slidably engaging the inner wall of said cylinder at locations above and below, respectively, said first sealing means to thereby define a pair of fluid-containing chambers within said cylinder separated by said first sealing means, said piston rod passing through both said chambers and extending from one of said second or third sealing means outward from said cylinder through an open end thereof on one side of said one sealing means secured in said cylinder, the volumes of said chambers changing inversely equally as the piston rod moves relative to said cylinder in response to said changing load conditions, said interconnection between the units comprising pipe means, a first chamber on one side of said first sealing means in one cylinder being connected by said pipe means to a second chamber on the correspondingly opposite side of said first sealing means in the cylinder of an adjacent unit, said second chamber on said correspondingly opposite side of said adjacent unit being connected by said pipe means to a third chamber on the correspondingly opposite side of said first sealing means in the cylinder of another adjacent unit, said fluid in said chambers being incompressible.

2. A suspension system as claimed in claim 1, characterized in that each unit has two openings in the cylinder, one opening on each side of said first sealing means, but between said second and third sealing means carried on the piston rod, whereby fluid can enter or leave the said chambers defined in the units, through pipes, to chambers in other units.

3. A suspension system as claimed in claim 1, characterized in that the cylinder of at least some of said units carries an apertured or vented end cap on one end of said cylinder.

4. A suspension system as claimed in claim 1, characterized in that the piston rod in each unit has at least one groove at any one of said spaced second and third means carried on the piston rod, said groove itself holding a spring ring, whereby the said sealing means carried on the piston rod are secured in place on the piston rod.

5. A suspension system as claimed in claim 1, characterized by that the cylinder in each unit has at least one groove at the said first sealing means, said groove itself holding a spring ring, whereby said first sealing means is secured in place.

6. A suspension system as claimed in claim 1, characterized in that said unit includes an outer collar, concentric with the cylinder at the first sealing means, whereby said collar and the two portions of the cylinder on opposite sides of the said first sealing means are securely joined together to form an integral cylinder.

7. A suspension system as claimed in any one of claims 1 to 6, characterized by at least some of said units have an additional outer sleeve, concentric with the cylinder and secured to the cylinder from the said outer collar at said first sealing means and extending to completely surround the cylinder on one side of said first sealing means, the sleeve itself carrying mounting lugs or fixtures.

8. A suspension system as claimed in claim 1, characterized in that each unit has a dirt excluding flexible bellows, surrounding the cylinder and the extended part of the piston rod on one side of said first sealing means wherein the flexible bellows contain a quantity of corrosion preventing fluid.

9. A suspension system as claimed in claim 1 characterized in that each unit carries a spring abutment plate, fixed to the cylinder at the shoulder formed by the outer collar surrounding the cylinder at the position of said first sealing means.

* * * * *